April 7, 1964   D. L. WOLLE   3,127,766
APPARATUS FOR MEASURING THE STRENGTH OF A BOND
BETWEEN TWO PIECES OF MATERIAL
Filed Nov. 1, 1961
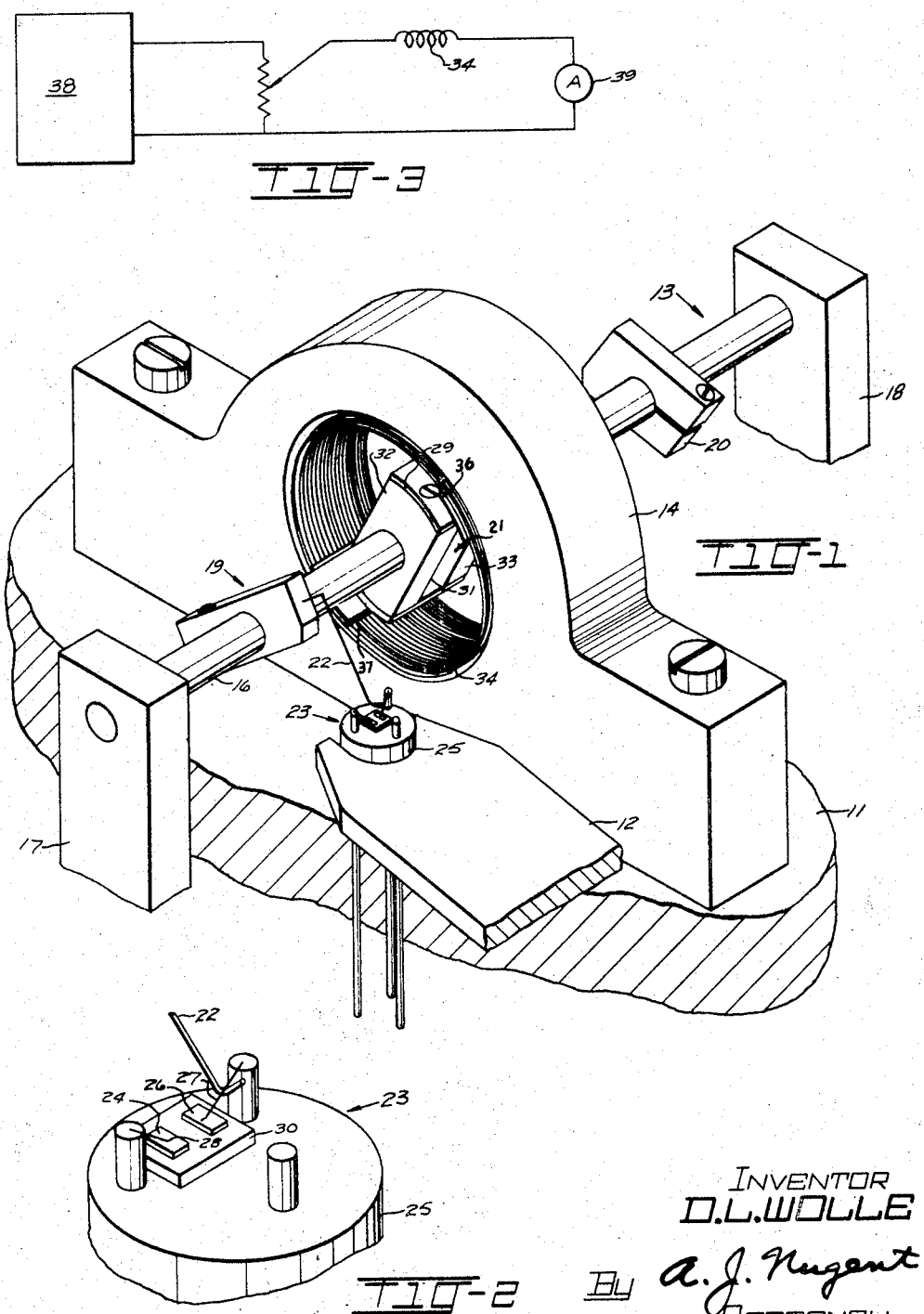
INVENTOR
D.L.WOLLE
By A.J. Nugent
ATTORNEY

United States Patent Office 3,127,766
Patented Apr. 7, 1964

3,127,766
APPARATUS FOR MEASURING THE STRENGTH OF A BOND BETWEEN TWO PIECES OF MATERIAL
Donald L. Wolle, Bern Township, Berks County, Pa., assignor to Western Electric Company, Incorporated, a corporation of New York
Filed Nov. 1, 1961, Ser. No. 149,462
2 Claims. (Cl. 73—141)

This invention relates to apparatus for measuring the strength of material and in particular to apparatus for measuring the strength of a bond between two pieces of material.

In the manufacture of devices having several component parts, it is necessary to provide means for connecting the several parts together to form a structurally sound unit. One of the methods employed to accomplish this interconnection is to bond one part to another part. Thus, for example, in the manufacture of semiconductor devices, the fine wires used as leads are bonded to the various electrodes of the semiconductor device by a thermocompression process.

The strength of the bonding, among other things, determines the strength of the entire device. Accordingly, knowledge of the bond strength is of prime importance in determining the usefulness of the device.

It is, therefore, an object of this invention to provide new and improved apparatus for measuring the strength of a bond between two pieces of material.

Another object of this invention is to provide apparatus for measuring the strength of the bond formed between an electrode of a semiconductor device and a wire used as a lead.

A further object of this invention is to provide apparatus for measuring the strength of a bond formed by thermo-compressive means.

In carrying out these and other objects of the invention, there is provided means for producing a magnetic field, a first member comprising one or more elements of magnetizable material located within the means for producing a magnetic field and fixed therein, a second member comprising one or more elements of magnetizable material located within the means for producing a magnetic field and arranged to move rotatably therein, and pulling means responsive to rotation of the second member for exerting a force on the bond.

In accordance with the general features of this invention, a device whose bond strength is to be measured is secured in securing means with one end of a bonded part thereof in engagement with the pulling means. The magnetic field resulting from actuation of the means for producing a magnetic field acts on the first and second magnetizable members and magnetizes both. Since both magnetic members are similarly situated in the magnetic field, i.e., they have their longitudinal axes parallel to each other, they both become similarly magnetized. This results in a mutual force of repulsion acting on the members, the magnitude of the force being proportional to the strength of the magnetic field.

The force acting on the second member causes rotation of that member, which in turn causes the pulling means to exert a force on the bond of the device under test. The strength of the bond is determined by increasing the magnetic field until failure of the bond results.

In one embodiment of the invention the magnetic field is produced by a solenoid energized by adjustable A.C. or D.C. voltage means, the strength of the magnetic field being proportional to the current flow within the solenoid coil. Consequently, since the force produced is proportional to the strength of the magnetic field, current sensitive means can be calibrated to read the bond strength directly.

The invention will be more readily understood from the detailed description which follows when read in conjunction with the drawings wherein:

FIG. 1 is a perspective view of an embodiment of the invention;

FIG. 2 is a detail view in perspective of a portion of FIG. 1 showing the pulling means engaging a bonded part of the device under test; and, FIG. 3 is a schematic diagram of an electrical circuit used as control and indicating means for the apparatus shown in FIG. 1.

Referring now to the drawings and in particular to FIG. 1, the apparatus shown therein includes a support 11, a holding fixture 12, a rotor 13 and a stator 14.

The holding fixture 12 is adapted to receive the device whose bond strength is to be measured. The fixture is capable of movement in angular and vertical directions by suitable means not shown. This facilitates loading and unloading of the device as well as enables positioning of the device for testing purposes.

The rotor 13 comprises a shaft 16 which is journaled in fixtures 17 and 18, pulling means 19, movable magnetizable means 21 and a counterweight 20.

The pulling means 19 includes a needle 22 formed into a Z-shaped structure and having one end thereof engaging a bonded part of the device 23 under test. It has been found that a structure of this type best absorbs any A.C. hum or oscillation that may exist due to use of the apparatus with an A.C. voltage.

In the embodiment of the invention shown in FIGS. 1 and 2, the device 23 under test is a partially assembled transistor including a header 25, a semiconductor wafer 30 having contact stripes 24 and 26 mounted on the header 25 and leads 27 and 28. The lead wires 27 and 28 are bonded to the stripes 24 and 26 by a thermo-compressive process. As illustrated, the needle 22 is positioned under the lead wire 27, so that when rotation of the pulling means occurs a force will be exerted on the bond.

The movable magnetizable means 21 comprises two diametrically opposed, spaced strips of magnetizable material 29 and 31 having their longitudinal axes parallel to one another and to the rotor shaft's axis of rotation. Members 32 and 33 are provided which serve as supports for strips 29 and 31 and as a lever arm by means of which a torque can be transmitted to the rotor shaft 16. The entire movable magnetizable means assembly 21 is positioned on the rotor shaft 16 such that it lies within the magnetic field produced by the stator coil 34.

The counterweight 20 is used as a means for returning the rotor 13 to its zero or home position, i.e., the position at which the bond strength test begins, after testing is completed.

The stator 14 comprises a coil 34 and two strips of magnetizable material 36 and 37, all located on the inner surface of the stator 14 housing. The stator magnetizable strips 36 and 37 are positioned such that they are diametrically opposite one another and, like the rotor magnetic strips 29 and 31, have their longitudinal axes parallel to one another and to the rotor shaft's axis of rotation. Further, both sets of magnetizable strips, i.e., movable and fixed, are angularly displaced with respect to one another in the rest position. As will be more fully explained below, this enables a torque to be applied to the rotor shaft 16 at this position.

The coil 34 is wound and disposed within the stator 14 housing in such a manner that when the coil is energized, the lines of flux of the magnetic field produced will be parallel to the axis of rotation of the rotor 13. In operation, the coil 34 is energized from a source of adjustable A.C. or D.C. potential 38, as shown in FIG. 3. An ammeter 39 is connected in series with the coil 34 to measure the energizing current. Excitation of the coil 34 creates a magnetic field withint he stator 14, the lines of flux of the magnetic field produced being parallel to the axis of rotation of the rotor 13.

The magnetic field acts on the rotor magnetizable strips 29 and 31 and the stator magnetizable strips 36 and 37 and magnetizes both sets of strips similarly. Accordingly, a mutual force of repulsion is created between the two sets. Since the two sets are angularly dispaced with respect to one another, the force acting on the movable set will always have a component in a direction perpendicular to the longitudinal axes of the lever and supporting members 32 and 33. As a result, a torque will be applied to the rotor shaft 16 causing rotation thereof, the amount of rotation being dependent on the force necessary to break the bond. The amount of rotation or force necessary to break the bond is controlled by varying the adjustable energizing means 38.

The magnitude of the force applied to the bond is directly proportional to the strength of the magnetic field and inversely proportional to the square of the distance between the movable magnetizable strips 29 and 31 and the fixed strips 36 and 37. Accordingly, since the magnetic field is proportional to the current flow within the coil 34, a current sensitive device, such as an ammeter 39, can be calibrated to indicate the force directly.

Although two sets of movable and fixed magnetizable strips are shown, one set, e.g., 29 and 36, is all that is necessary, the purpose of the second set being to double the force acting on the bond. Conversely, if it is desired to increase the force acting on the bond by a factor greater than two, three or more sets could be employed.

The bond strength of the device is indicated by the ammeter-reading (in units of force) immediately prior to failure. After failure of the bond, power is removed and the counterweight 20 brings the rotor 13 back to its zero position.

It is to be understood that the above description and arrangements are simply illustrative of the application of the principles of the invention. Other arrangements than those proposed may be readily devised by a person skilled in the art which will embody the principles and fall within the spirit and scope of the invention.

What is claimed is:
1. Apparatus for measuring the strength of a bond between two pieces of material which comprises:
   a stator including a field winding in hollow coil form and a stationary mass of magnetizable material encompassed by the field winding;
   a rotor mounted for rotation within the field winding of the stator, said rotor including a rotatable shaft and a movable mass of magnetizable material attached to the shaft in eccentric relation to the rotational axis of the shaft;
   means for energizing said field winding to produce a magnetic field within a region including the two masses of magnetizable material such that said masses are magnetized wtih the same polarity and tend to repel each other;
   means for biasing the rotor to a predetermined angular position when the field winding is de-energized, in which position the two masses are in relatively close proximity but angularly offset from one another so that upon energization of the field winding a torque tending to rotate the shaft results from the repulsion between the magnetized masses;
   means for fixedly supporting two pieces of material bonded to each other adjacent to the shaft;
   an arm secured to said shaft and extending generally radially therefrom, said arm having a free end thereof arranged to engage one of said two bonded pieces of material and to exert a force on the bond between said two pieces of material when the torque is applied to the shaft;
   means for varying the magnitude of the current supplied by the field energizing means to vary the resultant torque applied to the shaft; and
   a meter responsive to the current supplied to the field winding, said meter being calibrated to indicate directly the magnitude of the force applied to the bond.
2. Apparatus for measuring the strength of a bond between two pieces of material which comprises:
   a stator including a field winding in hollow coil form and a stationary mass of magnetizable material encompassed by the field winding;
   a rotor mounted for rotation within the field winding of the stator, said rotor including a rotatable shaft and a movable mass of magnetizable material attached to the shaft in eccentric relation to the rotational axis of the shaft;
   means for fixedly supporting two pieces of material bonded to each other adjacent to the shaft;
   means connected to said shaft and adaptable for connection to one of said two pieces of bonded material for exerting a force on the bond between said two pieces of material upon rotation of said shaft;
   means for energizing said field winding to produce a magnetic field within a region including the two masses of magnetizable material such that said masses are magnetized with the same polarity and tend to repel each other;
   a counterweight connected to said shaft in a predetermined angular relationship with said exerting means for biasing the rotor to a predetermined angular position when the field winding is de-energized, in which position the two masses are in relatively close proximity but angularly offset from one another so that upon energization of the field winding a torque tending to rotate the shaft results from the repulsion between the magnetized masses;
   means for varying the magnitude of the current supplied by the field energizing means to vary the resultant torque applied to the shaft; and
   a meter responsive to the current supplied to the field winding, said meter being calibrated to indicate directly the magnitude of the force applied to the bond.

References Cited in the file of this patent
UNITED STATES PATENTS

| | | |
|---|---|---|
| 1,743,798 | Park | Jan. 14, 1930 |
| 2,254,918 | Schwaiger | Sept. 2, 1941 |
| 2,377,869 | Ellicott | June 12, 1945 |